D. M. REUZÉ.
FISHING REEL.
APPLICATION FILED JUNE 1, 1917.
1,341,519. Patented May 25, 1920.
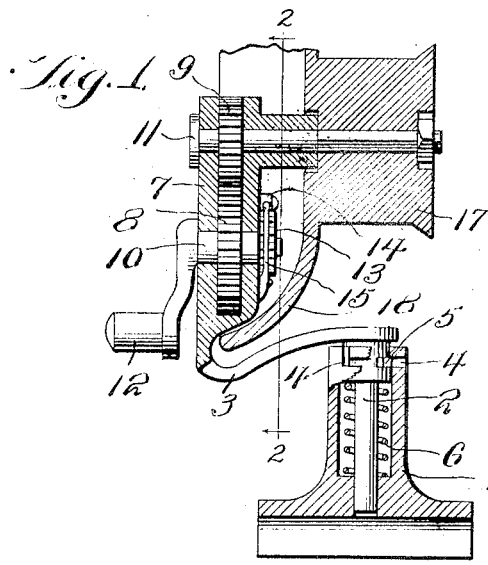
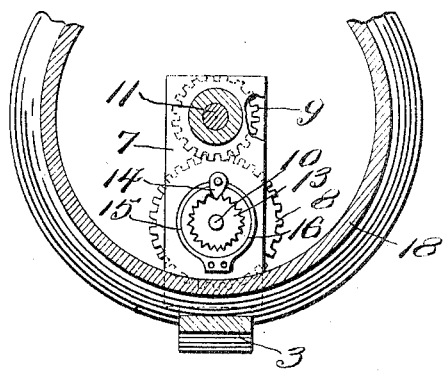
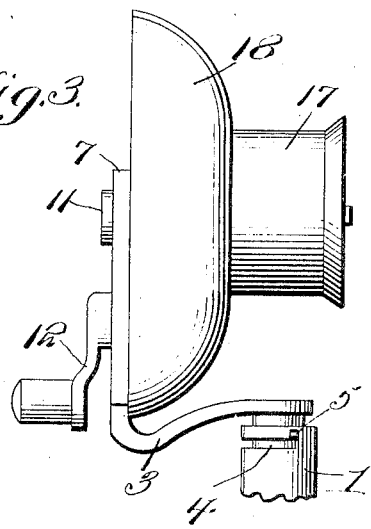
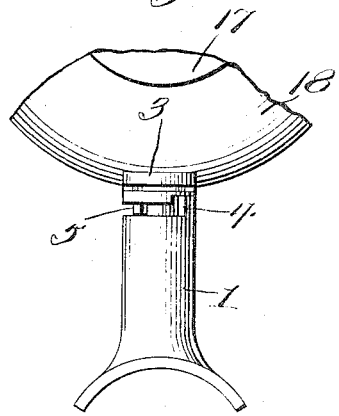
Inventor
Desire M. Reuzé
By B. Singer,
Attorney

UNITED STATES PATENT OFFICE.

DÉSIRÉ MARIE REUZÉ, OF RENNES, FRANCE.

FISHING-REEL.

1,341,519.  Specification of Letters Patent.  Patented May 25, 1920.

Application filed June 1, 1917. Serial No. 172,347.

*To all whom it may concern:*

Be it known that I, DÉSIRÉ MARIE REUZÉ, a citizen of the Republic of France, residing at Rennes, Ille-et-Vilaine, France, have invented new and useful Improvements in Fishing-Reels, of which the following is a specification.

This invention relates to improvements in throwing mills and other pieces for fishing devices particularly used when fishing in the throwing way.

In the appended drawing the figures represented are relative to the various objects of the invention.

In the accompanying drawings:—

Figure 1 is a vertical central sectional view of a fishing reel or line throwing mill constructed in accordance with my invention, and showing the gears in elevation.

Fig. 2 is a transverse sectional view of the same, taken on the plane indicated by the line 2—2 of Fig. 1.

Fig. 3 is a side elevation of the same.

Fig. 4 is a detail end elevation of the base and carrier of the reel.

This mill is especially constructed for throwing at a great distance light weights and is formed with three chief parts (see Figs. 1 and 2).

The metallic base 1 receives the rod 2 of the carrier 3 combined with a bayonet jointing 4, a spur 5, and a compression spring 6; this arrangement enables the fixing of the carrier 3 in the base 2 and also to separate same therefrom.

Over the carrier is provided a box 7 having two walls which are parallel and between which are lodged two gear wheels 8 and 9 the diameters of same being differently fulcrumed through parallel axes 10 and 11 crossing both walls of the box 7 upon which they rest. The lower shaft 10 carries outwardly the hand crank 12 and on its opposite end a small ratchet wheel 13 is secured, the teeth of which engage the point of a pawl 14 under the control of two spring leaves 15 and 16 of same length but of different thickness and sufficiently smooth for the hand of the fisherman who brings back the silk thread over the mill when turning the click and hand crank in the same direction as the fish which has taken the bait is drawing same. The spring pawl coacts with the ratchet wheel to prevent casual rotation of the reel.

The upper axis 11 carrying the small gearing wheel 9 carries also the spool 17 (see Fig. 3) upon which is wound the silk thread of the tackle, and which is fixed by a suitable nut. This spool being made of wood or of a light metal is provided with an enlarged bell shaped portion 18 for covering the box and gearings with the axis. This arrangement enables manipulations when fishing and avoids sliding of the silk thread from the mill or spool and also from being caught in the gearings. This spool may be detached from shaft 11, and replaced by another, at pleasure.

This mill being so devised, when the right hand of the fisherman is holding the metallic base between the forefinger and the major, said mill throws and remains at the same place while the left hand operates to bring the spool transversely with respect to the object for recovering the silk thread of the tackle.

What I claim is:—

1. In a fishing reel, a base for attachment to a rod, a carrier detachably secured to the base, a pair of shafts mounted in the carrier and provided with interengaging gears, one of said shafts also having a crank and a click wheel, a spool detachably mounted on the other shaft and having a recess in the end next to the carrier, the said gears and click wheel being received in said recess, and a spring pressed pawl also mounted in said recess and arranged to engage the click wheel.

2. In a device for throwing fishing lines of the character described, the combination of a metallic base for a rod provided with spool guides, a carrier comprising a bayonet lock and a spur for securing it in said base, a spring in said base below said carrier spur, a pair of superposed gear wheels in engagement with each other, shafts for said gear wheels mounted on the carrier, a crank secured to the shaft of the lower gear wheel, a small ratchet wheel upon the free end of the last named shaft, a pawl adapted to engage the teeth of said small ratchet wheel and springs of different thickness engaging said pawl, and a spool upon the horizontal shaft of the upper ratchet wheel, a nut securing said spool on said shaft, and a bell-shaped enlargement on said spool for covering the ratchet wheels and their shafts, substantially as described and for the purpose set forth.

DÉSIRÉ MARIE REUZÉ.